Sept. 29, 1964  K. A. DARROW ETAL  3,150,943
CYCLONE-TYPE DUST COLLECTOR
Filed Oct. 27, 1960
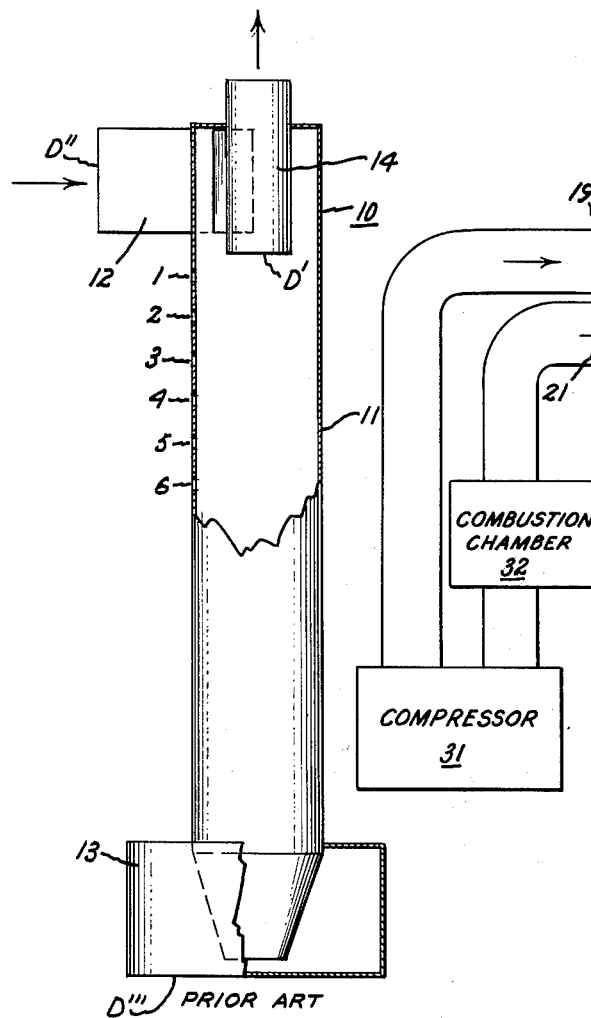
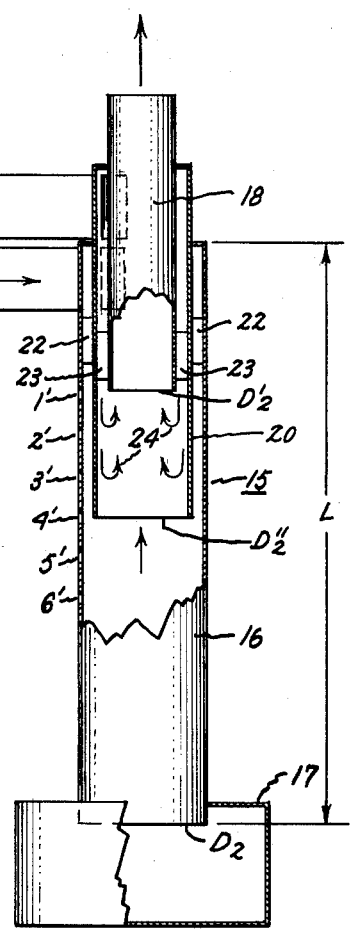
Inventors:
Kenneth A. Darrow,
Edwin H. Hull,
by James J. Lichiello
Their Attorney.

United States Patent Office 3,150,943
Patented Sept. 29, 1964

3,150,943
CYCLONE-TYPE DUST COLLECTOR
Kenneth A. Darrow, Sprakers, and Edwin H. Hull, Scotia, N.Y., assignors to General Electric Company, a corporation of New York
Filed Oct. 27, 1960, Ser. No. 65,326
3 Claims. (Cl. 55—261)

This invention relates to an improved cyclone-type dust collector and more particularly, to means for the prevention of short circuiting of dust particles through the exit of these collectors.

Cyclone-type dust collectors are widely used as general types of collectors for collecting small particle foreign elements from various industrial processes and, therefore, depending on the efficiency, prevent these particles from entering the atmosphere. Some foreign particles may be toxic not only to human beings, but also animal life, and even plant life. Accordingly, great care must be taken to minimize air pollution. Additionally, while some products of, for example combustion, are not necessarily toxic, they are extremely undesirable in closely inhabited areas so that most power plants are other industrial plants adjacent highly inhabited areas employ dust collectors. In combustion processes using solid fuel, such as, a gas turbine locomotive employing powdered coal, large amounts of high temperature gases are available for further use with the exception that the large ash content is injurious to equipment available to utilize the hot gas. An efficient dust collector in this instance would serve a twofold purpose of making large amounts of hot gas available for further work and minimizing pollution.

Cyclone-type dust collector efficiency is relatively high, depending on pressure drop, flow velocity, etc., but at best does not remove, for example, fly ash in the desired efficiencies, one reason being that a considerable portion of the particles escape through the exit before entering the separating zone. This is known as short circuiting. Cyclone-type dust collectors may be employed in plural or series form with inherent disadvantages of excess space requirements, maintenance problems, pressure losses, etc. It would, therefore, be desirable to have a standard cyclone-type dust collector of greatly improved efficiency with respect to smaller particle sizes so that substantial particle removal is obtained in a single pass of dust laden air through a standard type collector.

Accordingly, it is an object of this invention to provide an improved cyclone-type dust collector.

It is another object of this invention to minimize short circuiting of dust particles in a cyclone-type dust collector.

It is another object of this invention to provide a cyclone-type dust collector of increased efficiency.

It is a further object of this invention to provide increased efficiency of a cyclone-type dust collector associated with solid fuel power plants.

It is yet another object of this invention to provide an increased efficiency type cyclone-dust collector for locomotive gas turbines employing powdered solid fuel, such as coal.

Briefly described, this invention in preferred form includes an additional vortex generator adjacent the entrance of a cyclone-type dust collector together with the utilization of clean air in the collector to aid in efficient dust removal.

This invention will be better understood when taken in connection with the following descriptions and drawing in which:

FIG. 1 is a schematic representation of a standard-type cyclone dust collector; and FIG. 2 is a schematic representation of the improvement of this invention.

Referring now to FIG. 1, there is illustrated a standard cyclone-type dust collector 10. Collector 10 comprises generally a central casing 11 with an upper tangential air inlet 12 and a dust collector 13. A concentrically positioned tube 14 acts as the exit. In the operation of this type of device, dust laden air enters entrance 12 tangentially to be given a vortical or rotating movement. As the vortical or rotating movement of air proceeds down casing 11, larger dust particles are being constantly thrown outwardly due to centrifugal force and are collected by dust collector 13. The vortical downwardly moving air mass continually loses velocity and then reverses and flows upwardly in the center region of the casing 11 to exit from exit 14. Standard empirical relationships are well known for the proper dimensions of important parts. As employed for test purposes, these dimensions are given as follows: $D'$, exit diameter, $=D/2$. $D''$, inlet diameter, $=.8D$. $L=6D$ and entering velocity is about 60 to 100 feet per second. For test purposes, a series of 6 holes were drilled in casing 11 commencing at the bottom of exit 14 and spaced 1 inch apart axially along the casing 11. These holes as numbered 1–6 were employed for visual observation and pressure, velocity, etc. measurements.

Analysis and visual study of a reproduction of FIG. 1 apparatus as described indicates an inherent problem in dust separation. The dust laden gas in the first instance when in the vortical, whorling or whirling condition is not capable of throwing out the finer particles entrained in the air so that these particles short circuit, i.e., they are caught up in the upwardly moving air stream just below the end of exit 14 and exit therethrough with the clean air. Additionally, since the vortical mass of air is constantly losing velocity as it proceeds down casing 11, at the lower part, even the heavier particles are not thrown outwardly because of reduced "G" (gravity) forces and are caught up in the upwardly moving air stream also to be exited with the clean air from exit 14. These problems have been substantially minimized by the addition of a modified inlet arrangement and by further injection of clean air in an appropriate position. The configuration utilized to overcome this problem is illustrated in FIG. 2.

Referring now to FIG. 2, there is disclosed an apparatus 15 which includes a central casing 16, a dust collector or chamber 17, and exit tube 18 which projects into the upper end of casing 16 and is concentric therewith. Surrounding and concentric with exit 18, is a tangential clean air delivery structure 19. Structure 19 includes a tubular extension 20 concentric with casing 16 and projecting or extending downwardly into casing 16. Immediately below structure 19 is a dust laden air tangential inlet duct 21 which provides a whorling or vortical motion of the dust laden air to flow into casing 16 into and downwardly through the annular passage between extension 20 and casing 16. A series or circumferential row of turning vanes 22 may be employed in the annular passage between extension 20 and casing 16 and also a further row 23 in the annular passage between exit 18 and inlet 20. These vanes are positioned at approximately a 40° angle with respect to incoming air, both clean and dust laden, to provide whirling action for inlets delivering flow in the axial direction.

Operation of this configuration is as follows. Clean air enters inlet 19 and dust laden air enters inlet 21. As described with relation to FIG. 1, the dust laden air is given a downward vortical motion by tangential delivery and/or vanes 22, and proceeds down casing 16 as an undivided flow within its annular confines between casings 16 and 20, meanwhile throwing the larger particles entrained in the air stream outwardly to the walls of casing 16 and downwardly to be collected by collector 17. Clean air, at a pressure at least equal to that of the dust laden air, enters inlet 19 and is also given a downward vortical or whorling movement by tangential delivery and/or vanes 23 to proceed down inlet casing 20. Initially this flow of clean air at higher angular velocity is confined within the annular space between exit tube 18 and casing 20 during its downward spiralling flow. As any portion of this annular flow reaches the lower end of exit 18, some of this air (as is illustrated by arrows 24) proceeds out of exit 18 in a manner similar to short circuiting as described with relation to FIG. 1. Since this is clean air, there are no injurious results thereby. Most of the clean air proceeds in its spiralling motion down and out inlet extension 20. This is the point or area where short circuiting ordinarily occurs as described in respect to the collector illustrated in FIG. 1. Short circuiting is prevented or minimized by this invention because the mass of clean air moves at a higher angular velocity than the annular flow of dust laden air and as both flows proceed downwardly past the lower end of casing 20 the mass of clean air occupies the central region of the annular flow of dust laden air and acts as a barrier to short circuiting by substantially completely preventing the movement of the flow of dust-laden air radially inward into the lower end of casing 20. Vortical movement of clean air also imparts additional vortical action to the flow of dust laden air which is just beginning to lose velocity at this point, i.e., the vortices are in the same direction. The air returning up the center of casing 16 will contain some dust particles that have not been removed in the first pass through the separator. When this upwardly-moving air reaches inlet extension 20, dust particles carried thereby are thrown outwardly into the downwardly spiralling clean air flow because the zone of highest spin or "G" (gravity) field in the separator is found at this position. The high "G" field is due to the smaller effective diameter of the separator and high inlet velocity of the clean air. The upwardly moving particles are in effect moved outwardly into the entering dust laden air stream. Accordingly, the separator acts at two different times and in series to remove dust particles from the air moving through the separator with the second and more effective particle separation action being exerted on the exiting flow of cleaned gas shortly before its entry into exit 18. Such a separator is referred to as a dual vortex separator.

The vortexes must be kept separate, i.e., the clean air enters through a separate entrance and remains separate from dust laden air until after it has passed the exit tube. By this arrangement a flow of clean air occupies the central region within the annularly-shaped discharge of dust-laden air from between the substantially co-axially disposed cylindrical casings 16 and 20 to act as a barrier to the dust laden air and to provide the second stage of a two-stage or series separator. FIG. 2 represents a preferred arrangement for this purpose in that the clean air inlet 20 extends or projects into casing 16 much further than exit tube 18. In one example, the clean air section 20 extended about 4 inches below the end of exit tube 18, and vanes 22 and 23 were employed to provide additional spin motion.

Since the highest "G" forces are present in the upper portion of the dust-collectors discussed herein, the dual vortex arrangement must also be present there and be effective there. It is understood in FIG. 1 that the dual vortex arrangement is contained in the upper third of casing 16.

Design of these cyclone-type dust collectors follows standard practices as given in, for example, "Chemical Engineers Handbook," McGraw-Hill, 3d Edition, 1950, page 1024, and thereabout. The more important design measurements for the FIG. 2 embodiment are given in terms of the diameter $D_2$ of the central casing. $D_2$ is 3 inches, $D'_2$ is 1¾ inches, $D''_2 = 2\frac{3}{16}$ inches, and $L = 12$ inches. On page 1025 of the above-mentioned handbook in FIGS. (c) and (d) the paths that are believed to be taken in a cyclone separator by the dust-laden air and the cleaned air are illustrated. Therein it may be seen that the intention is that the cleaned gas moving up through the center of the separator shall retain substantial vorticity. In order to preserve the angular velocity of the cleaned gas rising up through the separator of this invention, the lower end of casing 16 does not have any obstructions or projections upon which the swirling gas can impinge and lose its velocity.

Commencing with the bottom of extension 20 six holes spaced one inch apart numbered 1'-6', were provided in order to obtain various measurements of given tests at these stations as described in FIG. 1. In the first test, air was caused to enter the dual vortex separator at velocities in the range of 60-100 feet per second. $TiCl_4$ vapor was injected through station 1' to cause a white stream of $TiO_2$ in order to observe flow patterns in the separator. Clean air was introduced at about a 20% greater velocity than test air through inlet 19. The volume of clean air was about one third of the total amount of air. While the same test on the apparatus of FIG. 1 indicated profuse short circuiting, the test on this invention indicated a substantial improvement because the clean air inlet acted as a barrier as before described. When using ash laden air as hereafter described, measurements of flow of the apparatus of FIG. 1 indicated that at about station 2 only 30 to 40% of the inlet air remained, and the balance had already short circuited or left by the exit. This also indicates that the air had left before the separator had sufficient time for effective separation. On the other hand, in the dual vortex separator similar measurements indicate almost 100% of ash laden air is continuing to spin up to station 4'. With the dual vortex separator, therefor the ash laden air spends considerably more time in the separator and subjected to separating action. More particularly, the ash laden air is being subjected to separating action in the central portion of the separator where the highest "G" forces are present.

Test procedures utilized a finely divided fly ash taken from a commercial separator, as described in FIG. 1, from the Kanawha River Plant of the Appalachian Power Company, Glasgow, West Virginia. This ash represents that ash passing through a cyclone collector and was obtained using a "Pangborn Bag" filter. In the following table, are performance indications of the efficiency of the dual vortex separator as compared to that of FIG. 1. Efficiency is measured as the weight of fly ash removed by the separator divided by the weight added to the entering air.

Table 1

| Separator | $\Delta_P$ | $\Delta_{P20}$ | Qcfm. | Efficiency |
| --- | --- | --- | --- | --- |
| Fig. 1 | 8 | | 31.2 | 74.4 |
| Fig. 1 | 8 | | 31.2 | 74.7 |
| Fig. 2 | 8 | 4 | 59.5 | 84.2 |
| Fig. 2 | 8 | 5 | 59.5 | 82.2 |
| Fig. 2 | 8 | 6 | 58.3 | 84 |
| Fig. 2 | 8 | 8 | 56 | 77.1 |
| Fig. 2 | 8 | 8 | 56 | 79.7 |
| Fig. 2 | 8 | 10 | 54.3 | 82.1 |

$\Delta_P$ is pressure drop in inches $H_2O$ across the separator for FIGS. 1 and 2 and $\Delta_{P20}$ is the pressure drop across the inner separator or inlet 20 for FIG. 2.

Tangential and axial velocity measurement were made in all six stations and at different radii. All tests were performed with an 8" $H_2O$ pressure drop across the separator. In the separator of this invention, FIG. 2, the peak tangential velocities were in the range commencing with about 190 feet per second at station 1' to about 125 feet per second at station 6. Axial velocities ranged from about 105 feet per second at station 1' to about 50 feet per second at station 6'. Similar measurements on the apparatus of FIG. 1 indicated an initial tangential velocity of about 140 feet per second tapering to about 80 feet per second at station 6, and axial velocities of about 65 feet per second at station 1 to about 20 feet per second at station 6. Comparison of these relationships indicates that a dual vortex separator has much larger axial and tangential velocities all along the casing, which are primarily responsible for dust removal and which aid in removing more particles in the dual vortex separator than in separator of FIG. 1. Other apparatuses such as that disclosed in FIG. 1 have drastically reduced tangential and axial velocities indicating that no effective particle removal is being obtained in the lower part of the casing. In fact, observation indicates that 55% of the incoming air has left the FIG. 1 apparatus by the time flow had reached station 4 and, of course, once the air has left, no further cleaning may be practiced thereupon.

The dual vortex separator is especially adaptable for a coal burning gas turbine locomotive. Ordinarily in gas turbine operation an excess of air is delivered to the combustion chambers. In practice, as much as 400% excess air is delivered to the combustion chambers to cool the products of combustion to an acceptable turbine inlet temperature of about 1400° F. This excess air passes through the burner where it is throttled, loses energy, and is loaded with fly ash. The air now proceeds directly to a separator which sees an increased volume of combustion products and a consequently less dense ash loading which makes it more difficult to remove the fly ash.

The dual vortex separator of this invention is employed with a gas turbine as described to take advantage of the excess air. In the application, only enough excess air is added by compressor 31 to the combustion chambers, such as combustion chamber 32, to keep the gas temperature at about 1700° F.–1800° F. The remainder is bypassed directly to the separator via clean air delivery duct 19. Direct advantages to be gained by this process are:

(1) The ash loading of the air would be very high for efficient separation.
(2) The ash would be nearer its fusion temperature making adhesion between ash particles easier.
(3) Only a minimum volume of ash laden gas would need be cleaned.
(4) Energy lost in throttling the excess air at the burner could be saved and used in the separator.

It can thus be seen that this invention provides an improved cyclone-type separator of increased efficiency and particularly adaptable to those apparatuses where excess air is available, for example, a coal burning gas turbine locomotive where a dual vortex separator utilizes about 30% of the excess air.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What we claim as new and desire to secure by Letters Patent of the United States is:

1. A cyclone separator for removing finely divided solid particles from gaseous fluids comprising:
 (a) first, second and third substantially co-axially mounted imperforate cylindrical conduits open at the lower ends thereof and extending substantially vertically,
  (1) said first, second, and third conduits respectively being of progressively smaller diameters with said second conduit being intermediate in length between the lengths of said first and third conduits and extending down into said first conduit a substantial distance below the lower end of said third conduit, said first and second conduits being closed and said third conduit being open at the upper ends thereof,
 (b) a collection chamber located below said first conduit and in flow communication therewith for receiving solid particles separated from the fluid containing solid particles,
  (1) said first conduit having the interior thereof below the lower end of said second conduit substantially free of obstructions,
  (2) said third conduit serving as the outlet through which fluid substantially free of solid particle content is withdrawn,
 (c) a first inlet to the upper portion of said first conduit for introducing a flow of gaseous fluid containing solid particles to be removed therefrom into the annular space between said first and second conduits,
 (d) means for imparting to the flow of fluid containing solid particles a vortical motion to cause such fluid to move downwardly between said first and second conduits as a first spiralling annular flow,
 (e) a second inlet to the upper portion of said second conduit for introducing a flow of gaseous fluid substantially free of solid particle content into the annular space between said second and third conduits,
  (1) the flow of gaseous fluid substantially free of solid particle content being substantial in volume relative to the volume of the flow of fluid containing solid particles, and
 (f) means for imparting to the flow of the fluid substantially free of solid particle content a vortical motion to cause such fluid to move downwardly between said second and third conduits as a second spiralling annular flow having the same sense of rotation but greater angular velocity than said first spiralling annular flow,
  (1) said second conduit completely isolating the downwardly moving flow of the fluid containing solid particles from the downwardly moving flow of the fluid substantially free of solid particle content from the time of entry of these fluids into the separator until these fluids have moved as said first and second flows down past the lower end of said second conduit whereby a particle separation zone generated by the vorticity of said second flow is enclosed in said second conduit between the lower end of said third conduit and the lower end of said second conduit and the upwardly moving centrally disposed flow of cleaned fluid is subjected to a second stage of particle separation prior to exit thereof through said third conduit.

2. An improved method for removing finely divided solid particles from gaseous fluids by imparting a vortical motion to the gaseous fluid comprising:
 (a) subjecting a first flow of gaseous fluid containing solid particles to a first stage of particle separation by imparting to said first flow a vortical motion to cause such fluid to move downwardly in a spiralling annular configuration,
 (b) withdrawing fluid substantially free of solid particle content at a first station centrally located radially inwardly of the spiralling annular flow configuration of said first flow,
 (c) providing a second flow of fluid substantially free of solid particles in a substantially annular configuration having a downward spiralling motion immediately below said first station to maintain a zone of high vorticity, which acts upon all fluid prior to withdrawal thereof,
  (1) said second flow being introduced in a substantial volume relative to the volume of said first flow and with a higher angular velocity than said first flow,
 (d) maintaining said first and second flows out of contact with each of other during the entire downward movement thereof until said flows have passed down below said zone, (1) said second flow occupying the center region within said first flow upon passing below said zone providing a barrier to centrally directed movement of fluid from said first flow because of the higher angular velocity of said second flow for a substantial distance below said zone, and
(e) collecting the solid particles separated from the fluid containing solid particles.

3. The method for removing finely divided solid particles from gaseous fluids substantially as recited in claim 2 wherein the volume ratio of the second flow to the first flow is about 1:2.

References Cited in the file of this patent
UNITED STATES PATENTS

| | | |
|---|---|---|
| 1,753,502 | Clark | Apr. 8, 1930 |
| 2,252,581 | Saint-Jacques | Aug. 12, 1941 |
| 2,569,710 | Fitzpatrick | Oct. 2, 1951 |
| 2,593,718 | Bearn | Apr. 22, 1952 |
| 2,607,438 | Bailey | Aug. 19, 1952 |
| 2,771,962 | Yellott et al. | Nov. 27, 1956 |
| 2,873,815 | Swayze | Feb. 17, 1959 |
| 2,963,109 | Brookman et al. | Dec. 6, 1960 |